United States Patent [19]

Baba et al.

[11] Patent Number: 5,436,669
[45] Date of Patent: Jul. 25, 1995

[54] TELEVISION DISPLAY APPARATUS WITH ADJUSTABLE VERTICAL DEFLECTION WAVEFORM

[75] Inventors: Sumio Baba, Chiba; Toshiyuki Ogura, Tokyo, both of Japan

[73] Assignee: Sony Corporation, Tokyo, Japan

[21] Appl. No.: 265,036

[22] Filed: Jun. 24, 1994

[30] Foreign Application Priority Data

Jun. 25, 1993 [JP] Japan .................. 5-155659

[51] Int. Cl.⁶ .................. H04N 5/68; H04N 7/01
[52] U.S. Cl. .................. 348/556; 348/558; 348/704
[58] Field of Search .................. 348/555–558, 348/581, 704; H04N 5/68, 7/01

[56] References Cited

U.S. PATENT DOCUMENTS

| | | | |
|---|---|---|---|
| 4,414,571 | 11/1983 | Kureha et al. | 348/558 X |
| 4,547,708 | 10/1985 | Haferl | 348/704 X |
| 4,692,806 | 9/1987 | Anderson et al. | 348/399 |
| 4,730,215 | 3/1988 | Jose et al. | 348/581 X |
| 4,864,405 | 9/1989 | Chambers | 348/556 |
| 4,942,471 | 7/1990 | Chikuma et al. | 348/556 X |
| 5,029,007 | 7/1991 | Spiero | 348/556 |

Primary Examiner—Victor R. Kostak
Attorney, Agent, or Firm—Jay H. Maioli

[57] ABSTRACT

In order to display a video signal having an aspect ratio of 4 to 3 on a video display screen having a 16 to 9 aspect ratio a nonlinear vertical deflection signal is used to compress the video image along the top and bottom edges of the 16 to 9 aspect ratio screen. The video image is compressed only along the top and bottom edges of the screen because it has been found that motion of the point of view of the viewer relative to the displayed image is generally horizontal but is infrequently vertical. One approach to providing the non-linear vertical deflection waveform is to detect whether the input video signal for display on a 16 to 9 aspect ratio screen is a 4 to 3 aspect ratio signal and, if so, to read out special, non-linear data from a memory. This special waveform data is used to generate the non-linear vertical deflection waveform. If the input video signal is detected to be a 16 to 9 aspect ratio signal, standard data is read out from the memory to be used to generate the appropriate linear vertical deflection waveform.

12 Claims, 8 Drawing Sheets

Conceptional Drawing

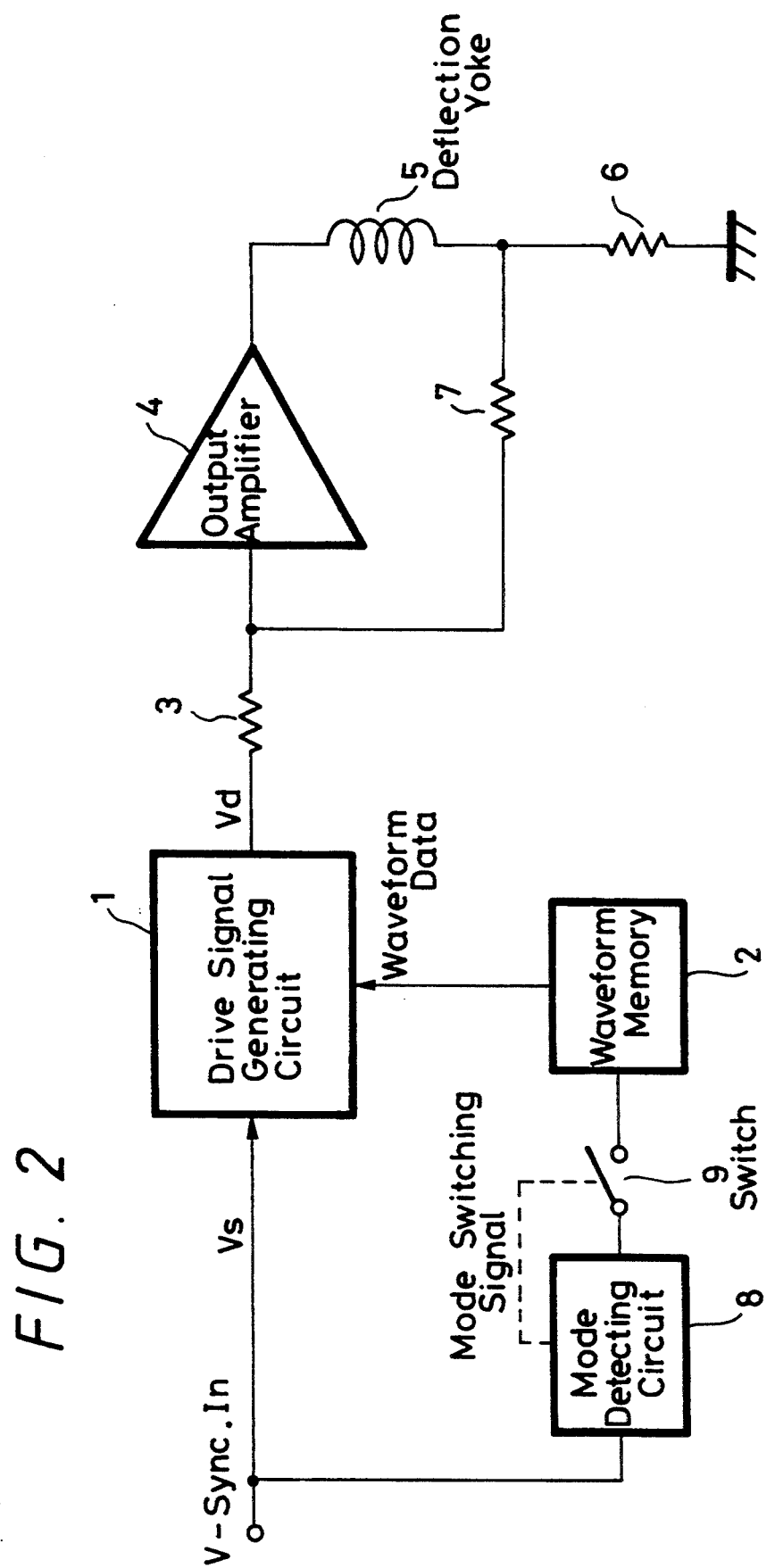

FIG. 8

|  |  | Horizontal Scanning Direction | Vertical Scanning Direction |
|---|---|---|---|
| Drama | Modern Drama | 21 Times | 6 Times |
|  | Period Adventure Drama | 12 Times | 4 Times |
| Baseball (1 Hour) | | 50 Times | 10 Times |
| Movie (2 Hours) | | 87 Times | 27 Times |
| News | | 191 Times | 90 Times |
| Variety Show | | 58 Times | 22 Times |

TELEVISION DISPLAY APPARATUS WITH ADJUSTABLE VERTICAL DEFLECTION WAVEFORM

BACKGROUND OF THE INVENTION

1. Field of the Invention

The present invention relates generally to a television receiver having a display screen with a wide aspect ratio of 16 to 9 and, more particularly, to such a television receiver that can display a video image having a 4 to 3 aspect ratio.

2. Description of the Related Art

A television receiver having a display screen with the wide aspect ratio of 16 to 9 has been put into practical use. When displaying a video signal conformed to a standard aspect ratio of 4 to 3 on a display screen of such a television receiver, the conventional approaches have resulted in displays such as shown in FIGS. 6A to 6C. That is, in the approach resulting in the display of FIG. 6A, portions where no video image is displayed are formed at the right and left ends of the display screen. In the approach resulting in the display of FIG. 6B, the display of the video signal is expanded such that a horizontal width of the 4 to 3 aspect ratio video image coincides with the horizontal width of the 16 to 9 aspect ratio display screen.

According to the displaying method corresponding to FIG. 6A, however, the portions where no video image is displayed at the right and left ends of the display screen are a disadvantage to the viewer. According to the displaying method of FIG. 6B, the upper and lower portions of the video image based on the video signal to be displayed on the display screen are cut off and not seen, so that the viewer is again disadvantaged because he can not see all the video image present in the video signal.

Further, as shown in FIG. 6C, there has been proposed another display approach intended as a improvement over the approach of FIG. 6A in which the video image based on the 4 to 3 aspect ratio video signal is expanded in the horizontal direction, so that the video image based on the 4 to 3 aspect ratio video signal coincides with the horizontal and vertical widths of the 16 to 9 aspect ratio display screen. Nevertheless, according to this display method, since the video image on the display screen is compressed in the vertical direction, the visual image looks very unnatural. This system is described in published EP Patent Application 0,551,168, for example.

In contrast to the aforesaid various displaying methods, there has been proposed still another displaying method resulting in the screen shown in FIG. 7A. In this method, as shown by FIG. 7B representing a conceptual drawing of FIG. 7A, only portions in the vicinity of the right and left ends of the video image on the screen are expanded in the horizontal direction. According to this method, a viewer can see the video image on the screen with little unnatural feeling, because the video image can be displayed naturally at the center portion of the display screen. In addition, the viewer's visual recognition of the video image becomes weaker at the vicinity of the right and left ends when the viewer looks at the center portion of the display screen.

When such a display is performed on the screen, however, if the video image based on the video signal moves to the right or to the left, the moving speed of the video image becomes uneven. As a consequence, a viewer feels very unnatural when watching such a moving image. That is, when such a display is performed on the screen, a viewer can see the video image with little unnatural feeling if the view point of the viewer on the screen is fixed, however, the viewer feels very unnatural as the viewer moves his view point to the right or left.

According to an investigation that has been performed as to the number of movements of the viewer's view point when the viewer views various kinds of programs found in general television broadcasting, it has been proved, as shown by the table of FIG. 8, that the number of movements of view point in the vertical direction is much less by a factor of two to five than the number of movements in the horizontal direction. The present invention has been made in view of this disparity between changes in horizontal and vertical points of view found in general television program material.

A problem to be solved by the present invention is that, according to each of the previously proposed displaying methods as described above, when displaying the video image of the video signal with the standard aspect ratio of 4 to 3 on the display screen with the wide aspect ratio of 16 to 9, there is a fear that the viewer will likely feel the displayed visual image to be unnatural.

OBJECT AND SUMMARY OF THE INVENTION

Therefore, it is an object of the present invention to provide a television receiver having a 16 to 9 aspect ratio screen that can display video images of 4 to 3 aspect ratio that overcomes the above-noted defects inherent in previously proposed systems.

According to a first aspect of the present invention, there is provided a television receiver wherein, when displaying a video image based on the video signal conformed to the standard aspect ratio of 4 to 3 on a display with the wide aspect ratio of 16 to 9, a horizontal width of the video image of the input video signal screen is made substantially coincident with the horizontal width of the display screen, and the video image based on the input video signal is compressed in the vertical direction at a portion in the vicinity of at least one of the upper and lower edges of the display screen, so that a vertical height of the video image based on the video signal displayed on the display screen is made substantially coincident with the vertical height of the display screen.

According to another aspect of the television receiver of the present invention, a vertical linearity of the video image on the display screen is changed at the portion in the vicinity of at least one of the upper and lower edges of the display screen so as to be smaller, whereby the video image based on the video signal is compressed in the vertical direction at the portion in the vicinity of at least one of the upper and lower edges of the display screen.

According to another aspect of the television receiver of the present invention, there is provided a circuit to change a waveform shape of the signal used for correcting vertical linearity of the display screen, so that the vertical linearity of the visual image on the display screen is changed at the portion in the vicinity of at least one of the upper and lower edges of the display screen, so that the image is smaller at those locations.

According to a yet further aspect of the above-described television receiver according to the present invention, since the video image based on the video signal is compressed in the vertical direction at a portion in the vicinity of at least one of the upper and lower edges of the display screen, so that a vertical height of the video image based on the video signal is made substantially coincident with the vertical height of the display screen, a visual image affecting a viewer with little unnatural feeling can be displayed on the display screen.

BRIEF DISCLOSURE OF THE DRAWINGS

FIG. 2 is a circuit arrangement for realizing the display shown in FIG. 1A according to an embodiment of the present invention;

FIG. 8 is a table used to explain the present invention.

DETAILED DESCRIPTION OF PREFERRED EMBODIMENTS

Figure 1A:
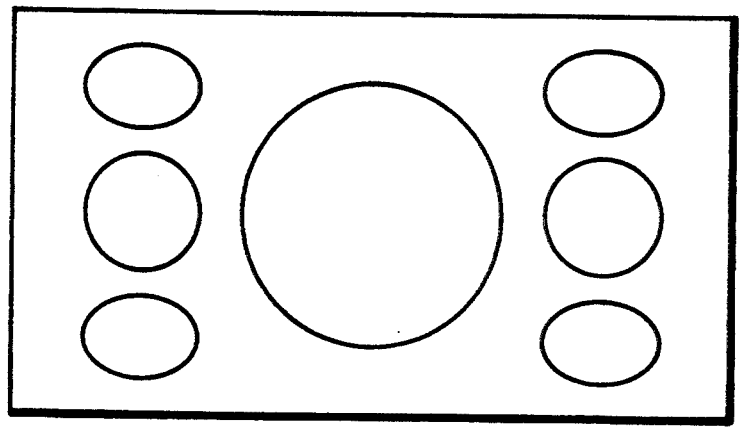
FIG. 1A and FIG. 1B are diagrams used to explain an example of a display of a television receiver according to the present invention.
Figure 1B:
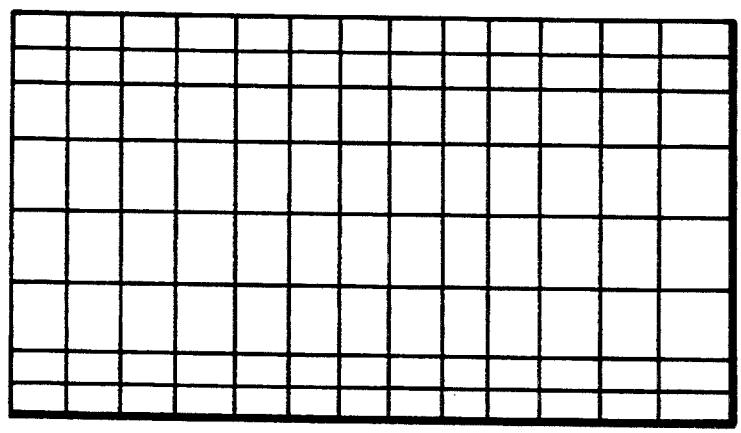

According to the present invention, as shown in FIG. 1A, a horizontal width of the video image based on the video signal to be displayed is made substantially coincident with the horizontal width of the display screen. Furthermore, the video image based on the video signal is compressed in the vertical direction in the vicinity of at least one of the upper and lower edges of the display screen, so that a vertical height of the video visual image based on the video signal displayed on the display screen is made substantially coincident with the vertical height of the display screen. In other words, in this case, the video image is compressed only at the portions in the vicinity of the upper and lower edges of the display screen. FIG. 1B represents a conceptional drawing of FIG. 1A and the amount of compression is shown by the extent of difference between the rectangles and uniform squares distributed over the face of the screen.

According to this displaying method, the video image can be displayed naturally at the center portion of the display screen, so that the viewer can see the visual image on the screen with little unnatural feeling even if the video image moves. This is so because the number of movements of the viewer's view point in the vertical direction is small compared with horizontal view point movements, as described above.

The circuit of FIG. 2 is employed in order to realize the displaying shown in FIGS. 1A and 1B. In FIG. 2, a drive signal generating circuit 1 for vertical deflection receives a vertical synchronizing signal Vs derived in the known manner from the video signal to be displayed. A mode detecting circuit 8 also receives the vertical synchronizing signal $V_s$, and the mode detecting circuit 8 detects whether the supplied video signal is to be depressed or not. When the vertical signal is detected to belong to a signal to be depressed, that is, when the signal being input is of the standard aspect ratio of 4 to 3, the mode detecting circuit 8 outputs a signal fed to a waveform memory 2 via a switch 9. The switch 9 can be closed by the viewer when the 4 to 3 aspect ratio signal is to be viewed or the switch 9 can be actuated by the mode detecting circuit 9, as shown by the dashed line in FIG. 2. Alternatively, switch 9 could be eliminated. Then, arbitrary waveform data from a waveform memory 2 is supplied to the drive signal generating circuit 1, and the drive signal generating circuit 1 generates a drive signal Vd for vertical deflection. By arbitrary is meant that the waveform is selected in keeping with practicing this invention.

The drive signal delivered from the drive signal generating circuit 1 is supplied to one end of a vertical deflection yoke 5 through a current limiting resistor 3 and an output amplifier 4. The other end of the deflection yoke 5 is grounded through another resistor 6. The signal appearing at the connection node between the deflection yoke 5 and the resistor 6 is fed back to the input of the output amplifier 4 through a third resistor 7.

Figure 3A:
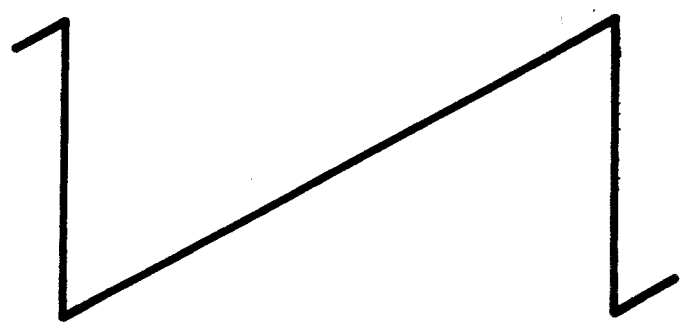
FIGS. 3A to 3D are waveform diagrams used to explain the operation of the circuit of FIG. 2.
Figure 3B:
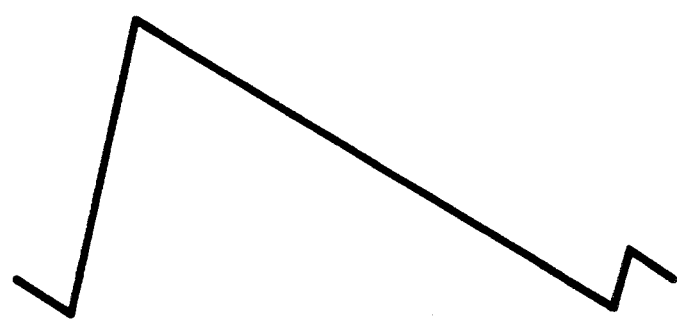
Figure 3C:
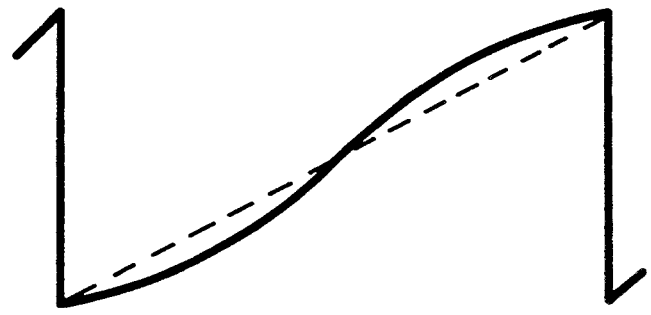
Figure 3D:
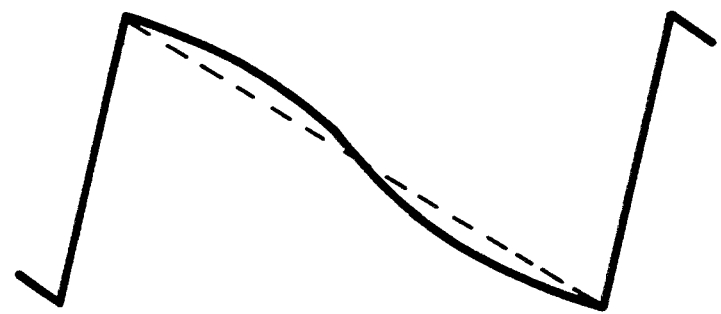
Figure 6A:
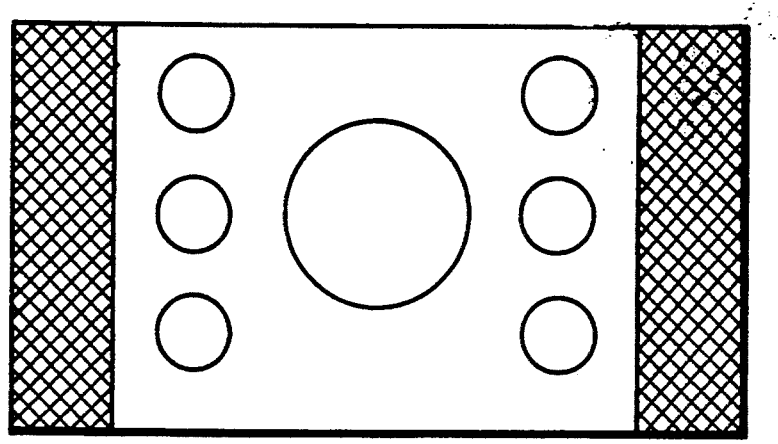
FIGS. 6A to 6C are diagrams used to explain examples of a display according to a previously proposed television receiver.
Figure 6B:
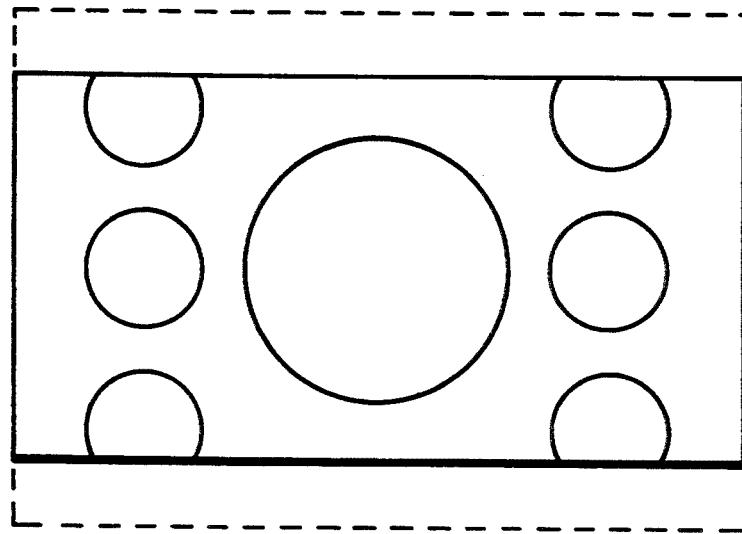
Figure 6C:
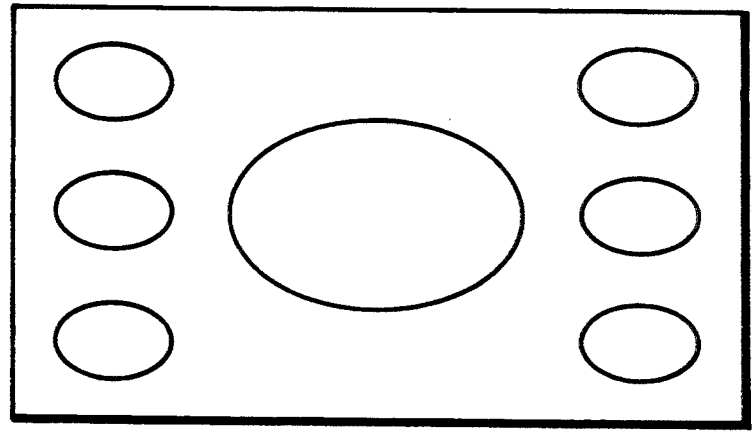
Figure 7A:
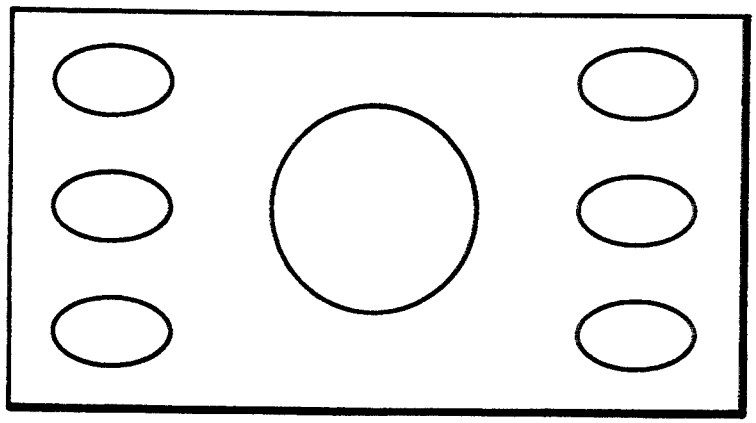
FIG. 7A and FIG. 7B are diagram used to explain an example of a display according to a previously proposed television receiver.

According to the thus constituted circuit arrangement, when performing a normal display on the display screen in accordance with the waveform data from the waveform memory 2, there is generated a drive signal Vd, as shown in FIG. 3A, from the drive signal generating circuit 1. This is based on the standard waveform data from the waveform memory 2. A vertical deflection currently as shown by FIG. 3B is caused to flow through the vertical deflection yoke 5, so that the normal display having the standard vertical linearity characteristic relative to a 16 to 9 aspect ratio is performed. Each of the aforesaid displays shown in FIGS. 6A and 7A is produced using this standard drive signal Vd. On the other hand, when the mode switching signal from the mode detecting circuit 8 is applied through closed switch 9 to the waveform memory 2 to change the waveform data delivered to the vertical drive signal generating circuit, a drive signal Vd shown in FIG. 3C, is generated from the drive signal generating circuit 1. The non-linearity of this signal is based on the so-called arbitrary data from the waveform memory 2. Then, in response to the drive signal Vd a deflection currently, as shown by FIG. 3D, is caused to flow through the deflection yoke 5. This results in a display as shown in FIG. 1A in which the visual image based on the video signal is compressed in the vertical direction at the portion in the vicinity of at least one of the upper and lower edges of the 16 to 9 aspect ratio display screen.

According to this circuit arrangement of FIG. 2 there is provided a waveform memory 2 that changes the shape of the waveform of the vertical drive signal in order to correct the vertical linearity of the image on the display screen. When the waveform is changed by using this waveform data approach, the vertical linearity of the visual image on the display screen can be changed in the vicinity of at least one of the upper and lower edges of the screen, so as to be smaller in vertical height than it would be otherwise. As a consequence, the video image signal is compressed in the vertical direction along at least one of the upper and lower edges of the display screen, so that the vertical height of the video image based on the video signal displayed on the display screen is made substantially coincident with the vertical height of the display screen.

As described above, according to the aforesaid circuit arrangement, since the video image based on the video signal is compressed in the vertical direction at the portion in the vicinity of at least one of the upper and lower edges of the display screen so that the vertical height of the video image based on the video signal displayed on the display screen is made substantially coincident with the vertical height of the display screen, a visual image affecting a viewer with little unnatural feeling can be displayed on the display screen as a whole.

That is, in the aforesaid circuit arrangement, since the horizontal linearity of the video image displayed on the display screen is always kept normal, a viewer can see the video image on the screen without any unnatural feeling even if the viewer's view point moves in the horizontal direction. In contrast; the viewer can see the video image on the screen with little unnatural feeling even if the viewer's view point is occasionally shifted in the vertical direction, because the number of movements of viewer's view point in the vertical direction is small as described above.

Furthermore, since the video image of the 4 to 3 aspect ratio video signal is displayed over the entire area of the 16 to 9 aspect ratio display screen and is displayed normally at the center portion thereof, the viewer can see the visual image with little unnatural feeling. In general, most ordinary images are symmetrical with respect to a center line running vertically on the screen but few ordinary images are symmetrical with respect to a center line running horizontally on the screen. Thus, the viewer sees a visual image with less unnatural feeling, even if the video image is distorted in linearity in the vertical direction. Further, the degree of distortion of the vertical linearity of the video image is about 10% or slightly more, in order that the vertical height of the 4 to 3 aspect ratio video image based on the video signal displayed on the 16 to 9 aspect ratio display screen is made substantially coincident with the vertical height of the display screen. This degree of distortion is permissible to television receivers at the initial stage of television broadcasting.

Furthermore, in the ordinary cathode ray tube the amount of curvature of the face plate in the vertical direction is larger than that in the horizontal direction. Moreover, the curvature of the face plate in the vertical direction in a cathode ray tube with the aspect ratio of 16 to 9 is larger than that on a cathode ray tube with the standard aspect ratio of 4 to 3. This larger curvature of the face plate in the vertical direction is canceled by the aforesaid modification of the linearity of the video image in the vertical direction, so that it seems visually as if the curvature of the face plate in the vertical direction is made smaller by the modification. This means that any visual unnatural feeling of the video image is further decreased.

Figure 4A:
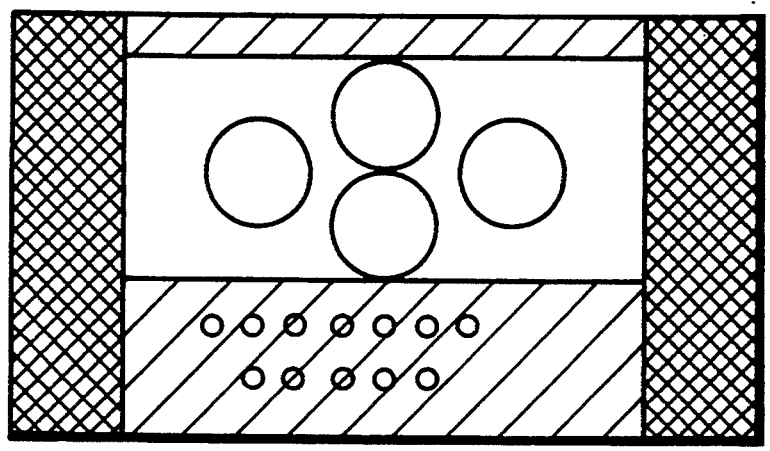
FIGS. 4A to 4C are diagrams used to explain a display of the television receiver according to another embodiment of the present invention.
Figure 4B:
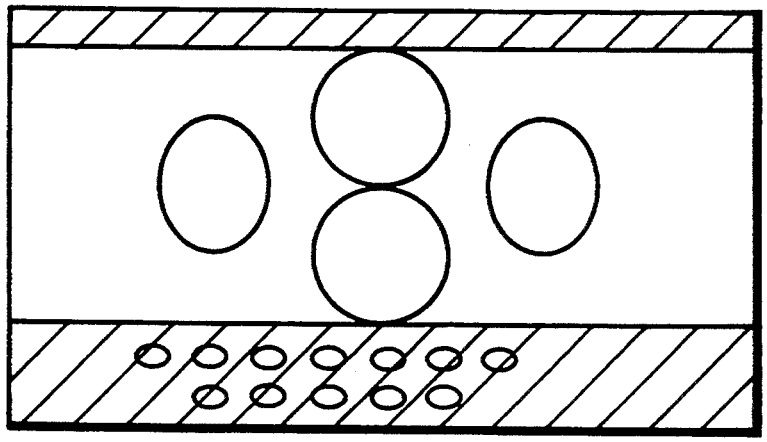

According to the aforesaid circuit arrangement, the video image can be displayed satisfactorily even when the video image based on a video software is displayed with the so-called CinemaScope size without performing any trimming. That is, in some of the previously proposed approaches to displaying such video software, subtitles are displayed at the lower portion of the display screen out of the video image as shown in FIG. 4A by the several circles in the lower cross-hatched portion. In this case, such a display as shown in FIG. 4B can be obtained according to the aforesaid circuit arrangement of the present invention. The subtitles are represented in FIG. 4B as the larger sized ovals along the bottom of the screen below the image.

Figure 4C:
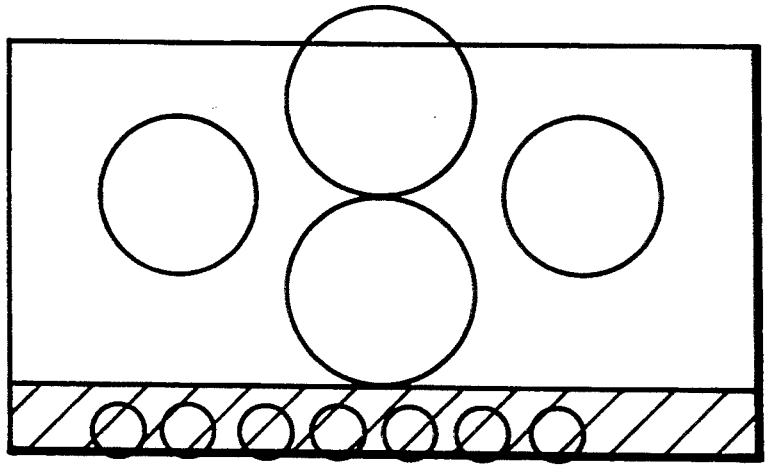

Accordingly, in this case, although the subtitles are slightly flattened by the vertical compression, such subtitles can be read without any difficulty and, hence, the viewer can enjoy the video software satisfactorily. In contrast, when such the software is displayed according to the conventional enlarging displaying method, both the upper portion of the video image and the subtitles are cut off and not fully displayed on the screen, as shown in FIG. 4C.

Figure 5:
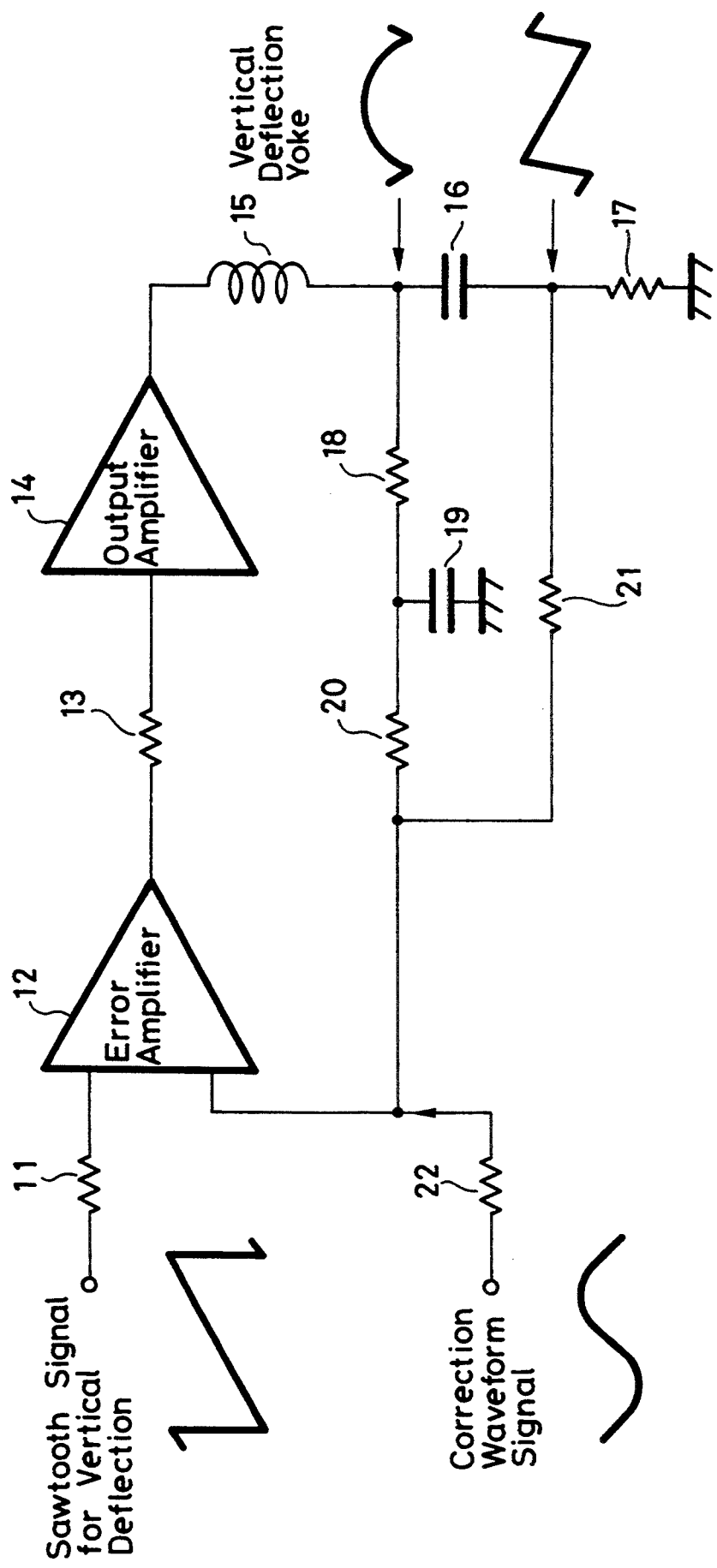
FIG. 5 is a circuit arrangement for realizing the display shown in FIGS. 4A to 4C according to another embodiment of the present invention.

FIG. 5 shows another embodiment of the circuit arrangement for realizing the aforesaid displays according to the present invention, in which a sawtooth signal of the vertical period is supplied to one input of an error amplifier 12 through a resistor 11. An output signal from the error amplifier 12 is supplied to the input of an output amplifier 14 through a resistor 13, and an output signal from the output amplifier 14 is supplied to one end of the vertical deflection yoke 15.

The other end of the vertical deflection yoke 15 is grounded through a series connected capacitor 16 and resistor 17. Accordingly, a signal having parabolic-shaped waveform with the vertical period, as shown in FIG. 5, is obtained from the other end of the vertical deflection yoke 15. This signal is fed back to the other input of the error amplifier 12 through a resistor 18, a grounded capacitor 19 and a resistor 20. Further, a sawtooth signal having the vertical period, as shown in FIG. 5, is obtained at the connection mode between the capacitor 16 and the resistor 17. This sawtooth signal is fed back to the other input of the error amplifier 12 through a resistor 21.

According to this circuit arrangement, a correction waveform signal having the vertical period, as shown in FIG. 5, is supplied to the other input of the error amplifier 12 through a resistor 22, so that the linearity of the video image on the display screen is changed in the vertical direction just like the example shown in FIGS. 3C and 3D. This correction waveform is shown connected directly to the other aspect of the error amplifier 12, but it is understood that a switch could be provided along with an aspect ratio or mode detecting circuit.

Although in the above-described embodiments the linearity of the video image in the vertical direction on the display screen is changed, so that a video image is symmetrical about the center line running horizontally on the screen, the present invention may be modified in the following manner. For example, when the upper half of a person is displayed on the screen, the changing ratio of the linearity of the video image corresponding to the upper half of the video image which corresponds to the face of the person may be made smaller but that corresponding to the lower half of the video image may be made larger. Further, in this case, an amount of the changing ratio of the linearity may be selected to be an arbitrary value.

Figure 7B:
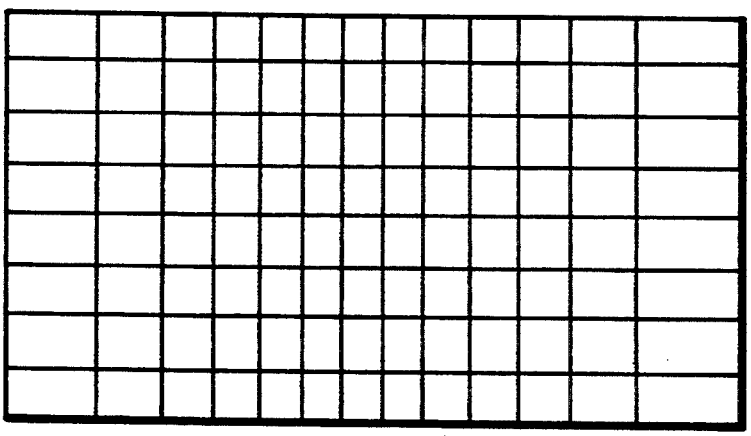

Furthermore, the present invention may be modified in a manner that the linearity of the video image in the horizontal direction on the display screen is further changed, as in the example shown in FIGS. 7A and 7B, in addition to the aforesaid change in the linearity in the vertical direction. In this case, the amount of change in the linearity can be decreased. The aforesaid change in the linearity of the video image may be performed by modifying the video signal through digital signal processing techniques, instead of changing the actual deflection signal waveform as in the above-described embodiments of the present invention.

Although the present invention has been described hereinabove with reference to the preferred embodiment, it is to be understood that the invention is not limited to such illustrative embodiment alone, and various modifications may be contrived without departing from the spirit or essential characteristics thereof, which are to be determined solely from the appended claims.

What is claimed is:

1. A television display apparatus including a picture frame of a first aspect ratio, the apparatus comprising:
   an input terminal for receiving one of a video signal of the first aspect ratio and a video signal of a second, different aspect ratio;
   a vertical scanning circuit for scanning a vertical scanning height of said video signal for displaying a video signal received at said input terminal on said picture frame; and
   control means for controlling said vertical scanning circuit to depress said vertical scanning height along at least one of upper and lower edges of a vertical height of said picture frame when said video signal of a second aspect ratio is received at said input terminal, wherein a vertical linearity of a vertical deflection waveform of said vertical scanning circuit frame is changed at the upper and lower edges of said picture frame so as to be compressed in the vertical direction by said control means and the change is in response to a symmetrical sinusoidal curve over a vertical scanning interval.

2. A television display apparatus according to claim 1, wherein said control means comprises a waveform memory for producing data of said symmetrical sinusoidal curve fed to said vertical scanning circuit.

3. A television display apparatus according to claim 2, further comprising a mode detecting circuit for detecting whether the video signal input at said input terminal has said first aspect ratio or said second aspect ratio and producing a control signal fed to said control means to depress said vertical scanning height according to the aspect ratio detected by said mode detecting circuit.

4. A television display apparatus according to claim 3, further comprising a switch for connecting said control signal from said mode detecting circuit to said control means.

5. A television display apparatus according to claim 1, wherein said vertical scanning circuit comprises an error amplifier receiving at one input a linear sawtooth vertical deflection signal for producing a vertical deflection signal fed to a vertical deflection coil of said vertical scanning circuit, and said control means comprises a capacitor connected to said deflection coil for connecting said deflection coil to ground through a resistor and feedback means for connecting a parabolic waveform signal developed at a connection node between said deflection coil and said capacitor back to a second input of said error amplifier, and wherein said control means further comprises a nonlinear correction waveform signal connected to said second input of said error amplifier.

6. A signal generating circuit for a television display having a predetermined aspect ratio picture frame, the circuit comprising:
   an input terminal for receiving video signals having at least two different aspect ratios;
   a vertical scanning circuit for scanning a vertical scanning height of an input video signal for display on said predetermined aspect ratio picture frame; and
   control means for depressing said vertical scanning in a vertical direction along at least one of upper and lower edges of the vertical height of said video signal for display on said predetermined picture frame when the aspect ratio of the input video signal is different than the predetermined aspect ratio of the picture frame, wherein a vertical linearity of a vertical deflection waveform of said vertical scanning circuit changed along the upper and lower edges of the picture frame is compressed in the vertical direction by said control means and the change is in accordance with a symmetrical curve over a vertical scanning interval.

7. A signal generating circuit according to claim 6, further comprising a waveform memory for producing data for generating said symmetrical curve.

8. A signal generating circuit according to claim 7, further comprising a mode detecting circuit for detecting the aspect ratio in the video signal input for display and producing a control signal fed to said control means to depress said vertical scanning height according to the aspect ratio detected by said mode detecting circuit.

9. A signal generating circuit according to claim 8, further comprising a switch for connecting said control signal to said control means.

10. A signal generating circuit according to claim 6, wherein said vertical scanning circuit comprises an error amplifier receiving at one input a linear sawtooth vertical deflection signal for producing a vertical deflection signal fed to a vertical deflection coil of said vertical scanning circuit, and said control means comprises a capacitor connected to said deflection coil for connecting said deflection coil to ground through a resistor and means for connecting a parabolic waveform signal developed at a connection node between said deflection coil and said capacitor back to a second input of said error amplifier, and wherein said control means further comprises a nonlinear correction waveform signal connected to said second input of said error amplifier.

11. A method of displaying a video signal having a 4 to 3 aspect ratio on a video display screen having a 16 to 9 aspect ratio, comprising the steps of:
   detecting whether an input video signal for display has the 4 to 3 aspect ratio;
   generating a nonlinear correction waveform;
   generating a nonlinear vertical deflection waveform from a linear vertical deflection waveform for the 16 to 9 aspect ratio display screen and the generated nonlinear correction waveform;
   feeding the generated nonlinear vertical deflection waveform to a vertical deflection coil; and
   compressing a video image along the top and bottom edges of the display screen using the nonlinear vertical deflection waveform, wherein the step of generating a nonlinear correction waveform includes the step of reading out waveform data from a waveform memory in response to said detecting the 4 to 3 aspect ratio of the input video signal and the step of generating a nonlinear correction waveform includes providing a symmetrical sinusoidal waveform over a vertical deflection period.

12. A method according to claim 11, wherein said step of generating a nonlinear correction waveform includes the steps of connecting a nonlinear correction waveform signal to a first input of an error amplifier that receives at another input a sawtooth vertical deflection signal and further comprising the step of feeding back to the first input of the error amplifier a parabolic waveform at a connection point between a capacitor and a vertical deflection coil that receives the nonlinear vertical deflection waveform developed by the error amplifier.

* * * * *